2,901,473
OXAZOLINE AND DIHYDRO OXAZINE MONOAZO DYESTUFFS AND THEIR METAL COMPLEX COMPOUNDS

Willy Steinemann, Basel, Switzerland, assignor to Sandoz Ltd., Basel, Switzerland, a Swiss firm No Drawing. Application May 12, 1958
Serial No. 734,444

Claims priority, application Switzerland May 17, 1957

7 Claims. (Cl. 260—146)

The present invention relates to monoazo dyestuffs and their metal complex compounds which in the non-metallized stated correspond to the formula

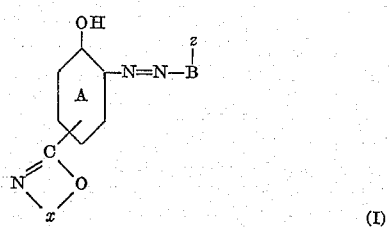

wherein B—z stands for the radical of a coupling component, x an ethylene or propylene radical, z a phenolic or enolic hydroxy group or a primary or secondary amino group in ortho-position to the —N=N— group, and wherein B and the nucleus A may be further substituted.

Especially valuable dyestuffs are the monoazo dyestuffs and their metal complex compounds, which in the metal-free state correspond to the formula

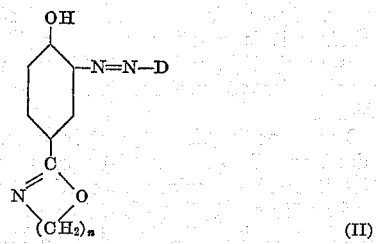

wherein D represents the radical of an aminonaphthalene coupling in ortho-position to the amino group, of a hydroxynaphthalene or of a hydroxyacylaminonaphthalene coupling in ortho-position to the hydroxy group or of a 3-methyl-5-pyrazolone coupling in ortho-position to the enolic hydroxy group, and $n$ is one of the integers 1 and 2.

The process for the production of the new monoazo dyestuffs and their metal complex compounds consists in coupling 1 mol of the diazo compound of an aminobenzene of the formula

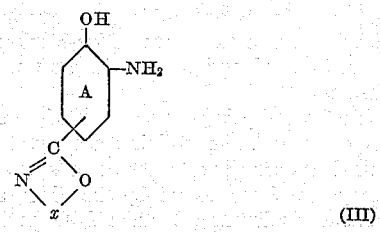

wherein $x$ and A possess the above-named meanings, with 1 mol of coupling component coupling in ortho-position to a phenolic or enolic hydroxy group or to a primary or secondary amino group and treating the resultant monoazo dyestuff in substance or on the fiber with a metal-yielding agent.

Examples of substituents contained in the nucleus A as here defined are halogen atoms (chlorine, bromine), nitro, acetylamino, carbomethoxyamino, carbethoxyamino, methyl, ethyl, sulfonic acid, sulfonic acid-(2'-hydroxy)-ethylamide and sulfonic acid hydroxypropylamide groups.

The choice of coupling components includes the following: hydroxybenzenes, hydroxynaphthalenes, aminonaphthalenes, alkylamino-, cycloalkylamino-, aralkylamino- and arylaminonaphthalenes, 1-aryl-3-methyl-5-pyrazolones, acylacetylaminoalkanes, acylacetylaminobenzenes and acylacetylaminonaphthalenes. These azo components may carry substituents, e.g. halogen atoms (chlorine, bromine), nitro, acetylamino, carbethoxyamino, methyl, ethyl, methoxy, ethoxy, sulfonic acid, sulfonic acid amide, sulfonic acid-mono- or dimethylamide, sulfonic acid-(2'-hydroxy)-ethylamide, sulfonic acid-di-(2'-hydroxyethyl)-amide, sulfonic acid-hydroxypropylamide, sulfonic acid-methoxypropylamide, sulfonic acid-ethoxyethylamide, sulfonic acid-phenylamide, sulfonic acid-N-2'-hydroxyethyl-N-phenylamide, sulfonic acid-(2'-carboxy)-phenylamide, methylsulfonyl groups or a

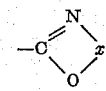

group, wherein $x$ possesses the aforementioned meaning.

The aminobenzenes of Formula III are diazotized by the normal method at 0–10° C.; the heterocyclic ring

is stable to acids and lyes at room temperature.

The so formed diazo compounds are coupled with a coupling component containing a phenolic or enolic hydroxy group at a temperature of 0–10° C. and preferably in a weakly acid to weakly alkaline or strongly alkaline medium, if desired in presence of pyridine. The coupling reaction with a coupling component containing a primary or secondary amino group is carried out at 10 to 20° C. in a weakly acid, preferably acetic acid, medium. The monoazo compounds thus formed are separated from the coupling mass, if necessary by the addition of salt, and then filtered off.

The conversion of monoazo dyestuffs into their metal complex compounds is carried out preferably with compounds of chromium or cobalt. Metallization is conducted to best effect in aqueous solution or in an organic medium, for example formamide, dimethylformamide or ethylglycol, or in the concentrated aqueous solution of an alkali metal salt of a low molecular aliphatic monocarboxylic acid. It is advantageous to proportion the reactants so that an amount of a metal yielding agent containing less than two but at least one atom of metal reacts upon two molecules of the monoazo dyestuff.

Suitable chromium compounds are chromic fluoride, chromic sulfate, chromic formate, chromic acetate, chromic potassium sulfate and chromic ammonium sulfate. The chromates as well, e.g. sodium or potassium chromate and bichromate, are eminently suitable for metallizing the monoazo dyestuffs; here it is advisable to work in a neutral to alkaline medium, to which reducing substances may be added if desired.

Cobaltous formate, cobaltous acetate and cobaltous sulfate are examples of the cobalt compounds employed.

When metallization is carried out in the concentrated aqueous solution of an alkali metal salt of a low molecular aliphatic monocarboxylic acid, water-insoluble metal compounds can be employed, for example cobalt hydroxide and cobalt carbonate.

A particularly satisfactory mode of operation is to conduct metallization in an aqueous or alkaline medium in which the metal compounds are in presence of compounds which maintain the metals dissolved in complex combination in caustic alkaline medium; examples of such compounds are tartaric acid, citric acid and lactic acid.

The resultant metal complex compounds are precipitated from the aqueous medium by the addition of salt, the organic metallizing solution being previously run into water if preferred. The product is then filtered off, washed if desired and dried.

The metal-containing azo dyestuffs are homogeneous metal complex compounds in which essentially one atom of metal is combined with two molecules of the monoazo compounds. These metal complex compounds are so-called 1:2 complexes in which one molecule of the monoazo compound is combined with approximately 0.3–0.7 atom of metal.

The new monoazo dyestuffs dye wool, silk, leather and synthetic polyamide fibers by the single-bath chrome process and the afterchrome process in yellow, red, violet, blue, green, brown and gray shades of good fastness to washing, milling, perspiration, light, potting and acids.

The metal-containing azo dyestuffs dye wool, silk, leather and synthetic polyamide fibers from neutral or weakly acid dyebaths in fast yellow, red, violet, blue, green, brown or gray shades. Those which possess sufficiently high solubility in organic solvents are suitable for dyeing manufactured fibers in the mass prior to spinning and for coloring all types of lacquer media and plastics. In these fields of application the dyestuffs show good fastness to light, washing, perspiration, gas fumes and acids.

The nomenclature of the diazo components used in the examples conform to the following formulae:

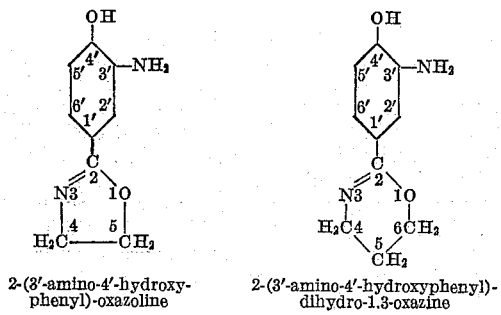

2-(3'-amino-4'-hydroxy-phenyl)-oxazoline    2-(3'-amino-4'-hydroxyphenyl)-dihydro-1.3-oxazine In the examples which follow the parts are parts by weight and the percentages are percentages by weight. The temperatures are in degrees centigrade.

Example 1

20 parts of 30% hydrochloric acid and 180 parts of water are run on to 19.2 parts of 2-(3'-amino-4'-hydroxyphenyl)-oxazoline. The mixture is cooled to 0° and a solution of 6.9 parts of sodium nitrite in 30 parts of water is gradually added. The solution is stirred for a further 20 to 30 minutes at 0–5° to complete diazotization. Then 25–30 parts of a 20% aqueous solution of sodium carbonate are added dropwise to the diazo solution to neutralize to a pH of 5.0–6.0. It is then combined at 0–5° with a solution of 22 parts of 1-acetylamino-7-hydroxynaphthalene, 4.4 parts of sodium hydroxide, 10 parts of anhydrous sodium carbonate and 250 parts of water. The mass is stirred for several hours at 0–5° until the coupling reaction is completed. The dark-colored suspension is subsequently heated to 40°, the monoazo dyestuff completely precipitated by an addition of common salt, and then filtered off, dried and ground. Upon grinding a black-blue powder is obtained which dissolves in water and concentrated sulfuric acid to give bordeaux red solutions. It can be applied to wool by the single-bath chrome process and the afterchrome process to give blue-gray shades which are notable for their excellent fastness to washing, milling and light.

The dyeing method is as follows:

2 parts of the above-described monoazo dyestuff are dissolved in 6000 parts of water at 40° with the addition of 10 parts of anhydrous sodium sulfate. 100 parts of wool are entered in this dyebath and the temperature increased to 100° in the course of about 30 minutes. After the addition of 20 parts of 10% acetic acid dyeing is continued for 30 minutes at the boil. 20 parts of 10% formic acid are then added and the bath maintained at 100° for a further 30 minutes with gradual replacement of the evaporated water. At this point 1 part of sodium bichromate in a 10% aqueous solution is added and dyeing continued for 30 minutes at 100°. The dyed wool is then removed, rinsed with water and dried. The afterchromed dyeing is level and blue-gray in shade; it is very fast to washing, milling and light.

The new diazo components used to produce the monoazo dyestuff of this example is obtained by mononitration of 2-(4'-hydroxyphenyl)-oxazoline (produced by treating 4-hydroxybenzene-1-carboxylic acid-(2'-hydroxy)-ethylamide with thionyl chloride or phosphorus oxytrichloride) and reduction of the nitro group to the amino group.

Example 2

40 parts of the monoazo dyestuff of Example 1 are dissolved in 400 parts of formamide. The solution is heated to 100–110° and 30 parts of chromic potassium sulfate are added within the next 30 minutes. The solution is maintained at 100–120° until formation of the chromium complex is completed. The chroming mass is then run into 1200 parts of water, upon which the chrome-containing azo dyestuff is salted out, filtered off and dried. Upon grinding it is obtained as a blue-black powder which dyes wool, silk, polyamide fibers and leather in blue-gray shades of excellent fastness to light, washing and milling.

2 parts of the chrome-containing azo dyestuff thus obtained are dissolved in 4000 parts of water at 40–50°. 100 parts of a previously wetted out wool fabric are introduced into this dyebath and 2 parts of 100% acetic acid are dropped in. The bath is then brought to the boil in 30 minutes and boiled for 45 minutes. The dyed wool is then taken out, rinsed with water and dried; the dyeing shows very good fastness to light, washing and milling.

Example 3

40 parts of the monoazo dyestuff of Example 1 are dissolved in a solution of 8 parts of sodium hydroxide in 1500 parts of water at 60°. A solution of 15 parts of cobaltous sulfate in 600 parts of water, made alkaline with an aqueous ammonia solution, is run into the above solution in the course of 30 minutes. The metallizing mass is maintained at 60° for 10 minutes, after which the cobalt complex compound is salted out and filtered off. It is dried and ground to give a blue-black powder which dyes wool and polyamide fibers in gray shades of very good fastness.

In the following table are listed further monoazo dyestuffs and metal-containing azo dyestuffs which are obtainable according to the details of Examples 1 to 3. They are characterized by the diazo and coupling components (columns (I) and (II)), the form in which they are applied (column (III)) and the shade of the metallized dyeings on wool (column (IV)).

The abbreviations used in the table represent:
Afterchr.=Afterchroming dyestuff
Cr=C.=Chromium complex dyestuff
Co=C.=Cobalt complex dyestuff

| Example No. | Diazo Component (I) | Coupling Component (II) | Form in which Applied (III) | Shade of metallized Dyeing on Wool (IV) |
|---|---|---|---|---|
| 4 | 2-(3'-amino-4'-hydroxyphenyl)-oxazoline. | 1-hydroxy-2-acetyl-amino-4-methylbenzene. | Cr—C | brown. |
| 5 | ----do---- | 2-hydroxynaphthalene. | Cr—C | reddish gray. |
| 6 | ----do---- | 2-hydroxynaphthalene-6-sulfonic acid. | Afterchr | Do. |
| 7 | ----do---- | 1-hydroxy-5.8-dichloronaphthalene. | Cr—C | reddish blue. |
| 8 | ----do---- | 2-aminonaphthalene. | Co—C | grey. |
| 9 | ----do---- | 2-phenylaminonaphthalene. | Cr—C | blue-gray. |
| 10 | ----do---- | 1-phenyl-3-methyl-5-pyrazolone-3'-sulfonic acid amide. | Cr—C | orange-red. |
| 11 | ----do---- | 1-acetoacetylamino-2-ethylhexane. | Cr—C | yellow. |
| 12 | ----do---- | 1-acetoacetylamino-naphthalene-4-sulfonic acid amide. | Cr—C | Do. |
| 13 | ----do---- | 1-hydroxynaphthalene-4-sulfonic acid. | Afterchr | reddish blue. |
| 14 | ----do---- | 1-(3'-chloro)-phenyl-3-methyl-5-pyrazolone. | Cr—C | orange-red. |
| 15 | 2-(3'-amino-4'-hydroxy-5'-acetylaminophenyl)-oxazoline. | 2-hydroxynaphthalene-6-sulfonic acid. | Afterchr | reddish gray. |
| 16 | 2-(3'-amino-4'-hydroxy-5'-nitrophenyl)-oxazoline. | 2-methylaminonaphthalene. | Co—C | gray. |
| 17 | ----do---- | 1-aminonaphthalene-4-sulfonic acid-(2'-hydroxy)-ethylamide. | Co—C | Do. |
| 18 | 2-(3'-amino-4'-hydroxy-5'-methylphenyl)-oxazoline. | 1-acetoacetylamino-2-methoxybenzene. | Cr—C | yellow. |
| 19 | 2-(3'-amino-4'-hydroxyphenyl)-dihydro-1.3-oxazine. | 2-phenylaminonaphthalene. | Co—C | gray. |
| 20 | 2-(3'-amino-4'-hydroxy-5'-carbomethoxyaminophenyl)-oxazoline. | 1-hydroxy-4-methoxynaphthalene. | Cr—C | blue. |
| 21 | 2-(3'-amino-4'-hydroxyphenyl)-oxazoline-5'-sulfonic acid-(2''-hydroxy)-ethylamide. | 2-[3'-hydroxynaphthyl(2')]-oxazoline. | Co—C | reddish gray. |
| 22 | 2-(3'-amino-4'-hydroxyphenyl)-oxazoline. | [7'-hydroxynaphthyl-(2')]-2-ketopiperidine. | Cr—C | reddish blue. |
| 23 | ----do---- | ----do---- | Co—C | reddish gray. |
| 24 | ----do---- | 1-(2'-hydroxy-5'-methylphenyl)-2-ketopiperidine. | Cr—C | brown. |
| 25 | 2-(3'-amino-4'-hydroxy-5'-carbethoxyaminophenyl)-oxazoline. | 1-phenyl-3-methyl-5-pyrazolone-4'-sulfonic acid amide. | Cr—C | orange red. |
| 26 | 2-(3'-amino-2'-hydroxy-5'-chlorophenyl)-4-methyloxazoline. | 1-(3'-cyano)-phenyl-3-methyl-5-pyrazolone. | Cr—C | Do. |
| 27 | 2-(3'-amino-2'-hydroxy-5'-ethylphenyl)-oxazoline. | 1-acetoacetylamino-octane. | Cr—C | yellow. |
| 28 | 2-(3'-amino-4'-hydroxy-5-propionylaminophenyl)-oxazoline. | 1-hydroxy-4-tert.butylbenzene. | Cr—C | brown. |
| 29 | 2-(3'-amino-4'-hydroxyphenyl)-4-methyloxazoline. | 2-hydroxy-6-bromnaphthalene. | Cr—C | reddish gray. |
| 30 | 2-(3'-amino-4'-hydroxyphenyl)-dihydro-1.3-oxazine. | 1-acetylamino-7-hydroxynaphthalene. | Cr—C | gray. |
| 31 | 2-(3'-amino-2'-hydroxy-5'-methylphenyl)-dihydro-1.3-oxazine. | 1-(3'-chloro)-phenyl-3-methyl-5-pyrazolone. | Co—C | bordeaux. |
| 32 | 2-(3'-amino-4'-hydroxy-5'-nitrophenyl)-4-methyldihydro-1.3-oxazine. | 1-aminonaphthalene-4-sulfonic acid-di-(2'-hydroxyethyl)-amide. | Co—C | blue. |
| 33 | ----do---- | 1-acetoacetylamino-1.1.3.3-tetramethyl-butane. | Cr—C | yellow. |
| 34 | 2-(3'-amino-4'-hydroxyphenyl)-dihydro-1.3-oxazine. | N-(4'-hydroxyphenyl)-1-aza-2-keto-3-oxacyclohexane. | Cr—C | brown. |
| 35 | ----do---- | N-[7'-hydroxynaphthyl (1')]-1-aza-2-keto-3-oxacyclohexane. | Co—C | reddish gray. |
| 36 | 2-(3'-amino-4'-hydroxyphenyl)-oxazoline. | 1-(4'-acetoacetyl-aminophenyl)-2-keto-pyrrolidine. | Cr—C | yellow. |
| 37 | ----do---- | 1-carbo-isopropoxyamino-7-hydroxynaphthalene. | Afterchr | gray-blue. |
| 38 | ----do---- | 1-hydroxy-4-methoxynaphthalene. | Co—C | blue. |
| 39 | ----do---- | 1-carbo-(2'-methoxy)-ethoxy-amino-7-hydroxynaphthalene. | Cr—C | gray. |
| 40 | ----do---- | 1-[naphthyl-(1')]-3-methyl-5-pyrazolone-6'-sulfonic acid. | Cr—C | orange-red. |
| 41 | 2-(3'-amino-4'-hydroxyphenyl)-4-methyloxazoline. | 1-(2'.3'-tetramethylene)-phenyl-3-methyl-5-pyrazolone-4'-sulfonic acid-amide. | Cr—C | Do. |
| 42 | ----do---- | 1-acetoacetylamino-benzene-4-sulfonic acid phenylamide. | Cr—C | yellow. |
| 43 | 2-(3'-amino-4'-hydroxyphenyl)-dihydro-1.3-oxazine-5'-sulfonic acid-(3''-hydroxy)-propylamide. | 2-benzylaminonaphthalene. | Co—C | gray. |
| 44 | 2-(3'-amino-4'-hydroxyphenyl)-4-methyl-oxazoline-5'-sulfonic acid. | 2-cyclohexylaminonaphthalene. | Afterchr | blue-gray. |
| 45 | 2-(3'-amino-4'-hydroxyphenyl)-dihydro-1.3-oxazine-5'-sulfonic acid. | 1-phenyl-3-methyl-5-pyrazolone-3'-sulfonic acid-(3''-methooxy)-propylamide. | Afterchr | orange-red. |
| 46 | 2-(3'-amino-4'-hydroxyphenyl)-oxazoline-5'-sulfonic acid. | 1-acetoacetylaminobenzene-4-sulfonic acid-ethylamide. | ---do--- | yellow. |
| 47 | 2-(3'-amino-4'-hydroxy-5'-chlorophenyl)-dihydro-1.3-oxazine. | 1-naphthyl(2')-3-methyl-5-pyrazolone-6'-sulfonic acid. | ---do--- | orange-red. |

| Example No. | Diazo Component (I) | Coupling Component (II) | Form in which Applied (III) | Shade of metallized Dyeing on Wool (IV) |
|---|---|---|---|---|
| 48 | 2 - (3' - amino - 4' - hydroxy - phenyl) - 4 - methyl - oxazoline. | 2 - acetoacetylamino - naphthalene - 6 - sulfonic acid. | Afterchr.. | yellow. |
| 49 | ....do.... | 2 - phenylaminonaphthalene - 3' - sulfonic acid amide. | Co—C.... | gray. |
| 50 | 2 - (3' - amino - 4' - hydroxy - phenyl) - oxazoline. | 2 - (4' - acetoacetylaminopheny) - oxazoline. | Cr—C.... | yellow. |
| 51 | ....do.... | 2 - (4' - acetoacetylaminophenyl) - 4 - methyloxazoline. | Cr—C.... | Do. |
| 52 | ....do.... | 2 - [3' - hydroxynaphthyl(2')] - dihydro - 1.3 - oxazine. | Co—C.... | reddish gray. |
| 53 | ....do.... | 1 - acetoacetylamino - benzene - 4 - sulfonic acid - methylamide. | Cr—C.... | yellow. |
| 54 | ....do.... | 1 - phenyl - 3 - methyl - 5 - pyrazolone - 3' - sulfonic acid - N - 2'' - hydroxyethyl - N - phenyl - amide. | Cr—C.... | orange-red. |
| 55 | ....do.... | 2-hydroxynaphthalene-6-sulfonic acid-phenylamide. | Cr-C...... | reddish gray. |
| 56 | 2-(3'-amino-4'-hydroxy-5'-bromphenyl)-oxazoline. | 1-acetoacetylaminobenzene-4-sulfonic acid. | Afterchr.. | yellow. |
| 57 | 2-(3'-amino-4'-hydroxy-5'-chlorophenyl)-oxazoline. | 1-acetylamino-7-hydroxy-naphthalene. | Cr-C...... | gray. |
| 58 | ....do.... | 1-phenyl-3-methyl-5-pyrazolone-4'-sulfonicacid-2''-ethoxyethylamide. | Cr-C...... | orange-red. |

Formulae of representative dyestuffs of the foregoing examples are as follows:

(Example 1)

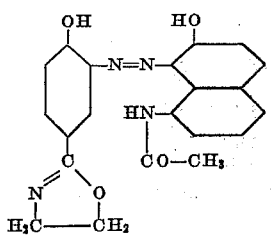

(Example 2)

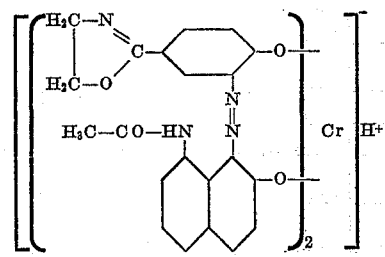

(Example 3)

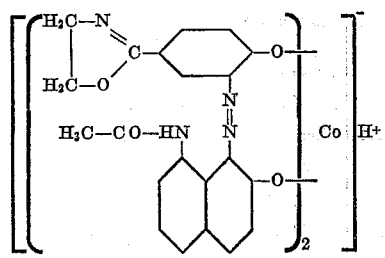

(Example 8)

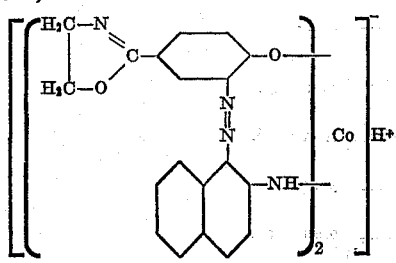

(Example 14)

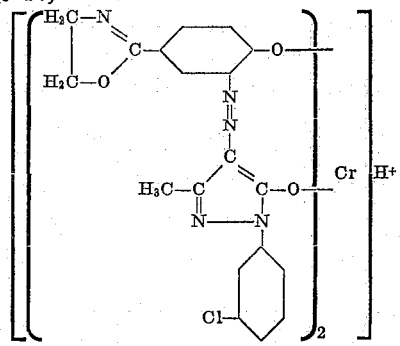

(Example 30)

(Example 39)

Having thus disclosed the invention what I claim is:
1. A member selected from the group consisting of monoazo dyestuffs of the formula

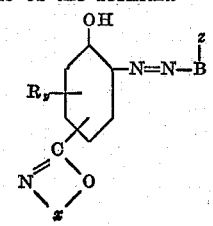

and the chromium and cobalt complex compounds thereof, wherein R represents a member selected from the group consisting of H, chloro, nitro, lower alkyl, acetyl, acetylamino, sulfo, sulfonic acid amide, sulfonic acid lower alkylamide, sulfonic acid di-lower alkylamide, sulfonic acid lower hydroxyalkylamide, sulfonic acid di-(lower hydroxyalkyl)-amide, sulfonic acid lower alkoxy-alkylamide, sulfonic acid mononuclear arylamide, sulfonic acid cyclohexylamide, sulfonic acid benzylamide, sulfonic acid morpholide, sulfonic acid pyrrolidide, and methylsulfonyl radicals; B-z represents the radical of a coupling component coupling in ortho-position to the substituent z and selected from the group consisting of 4-lower-alkyl-hydroxy-benzene, hydroxynaphthalene, aminonaphthalene, methylaminonaphthalene, phenylaminonaphthalene, phenylaminonaphthalene, acetoacetylaminooctane, acetoacetylaminobenzene, acetoacetylaminonaphthalene and 1-phenyl-3-methyl-5-pyrazolone coupling components; $x$ represents a member selected from the group consisting of $$-CH_2-CH_2-, \quad -CH_2-CH- \atop CH$$

$$-CH_2-CH_2-CH_2- \quad \text{and} \quad -CH_2-CH_2-CH- \atop CH_3$$

$y$ represents a numeral from 1 to 3; and $z$ represents a member selected from the group consisting of phenolic hydroxy group, enolic hydroxy group, primary amino, methylamino and phenylamino groups.

2. A metal-containing azo dyestuff which corresponds to the formula

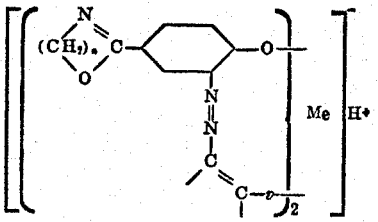

wherein $n$ is one of the integers 1 and 2, Me is a metal atom selected from the group consisting of chromium and cobalt, $v$ is a bridging element selected from the group consisting of —O— and —NH—,

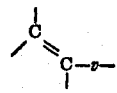

stands for a divalent radical of a coupling component selected from the group consisting of hydroxynaphthalene, hydroxy-acylaminonaphthalene, aminonaphthalene and 1-phenyl-3-methyl-5-pyrazolone.

3. The chromium complex dyestuff which corresponds to the formula

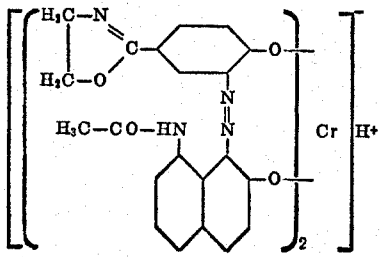

4. The cobalt complex dyestuff which corresponds to the formula

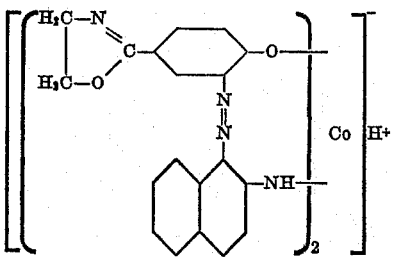

5. The chromium complex dyestuff which corresponds to the formula

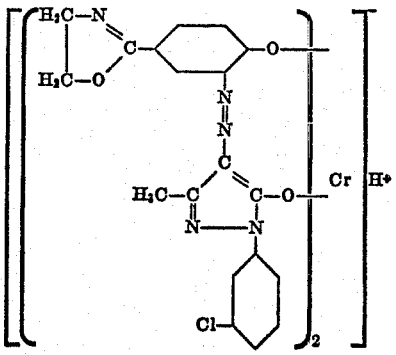

6. The chromium complex dyestuff which corresponds to the formula

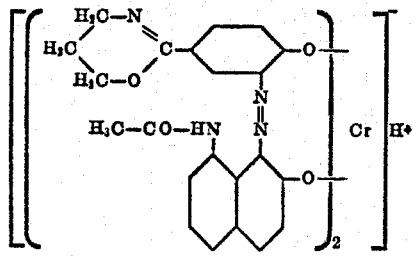

7. The chromium complex dyestuff which corresponds to the formula

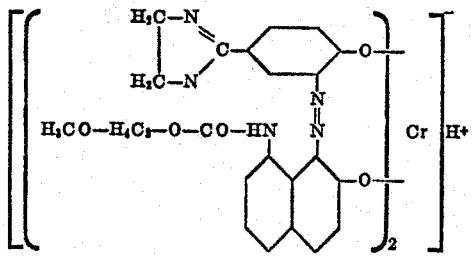

References Cited in the file of this patent

UNITED STATES PATENTS

| | | |
|---|---|---|
| 2,695,298 | Brody et al. | Nov. 23, 1952 |
| 2,725,377 | Brody et al. | Nov. 29, 1955 |

FOREIGN PATENTS

| | | |
|---|---|---|
| 460,725 | Great Britain | Feb. 3, 1937 |

UNITED STATES PATENT OFFICE

CERTIFICATE OF CORRECTION

Patent No. 2,901,473                                      August 25, 1959

Willy Steinemann

It is hereby certified that error appears in the printed specification of the above numbered patent requiring correction and that the said Letters Patent should read as corrected below.

Columns 7 and 8, in the table, third column thereof, opposite Example 50, for "acetoacetylaminopheny" read -- acetoacetylaminophenyl --; column 8, in the formula headed Example 14, there should be a minus (-) sign adjacent the upper right-hand end of the right-hand bracket; column 9, lines 21 to 23, for the second formula reading

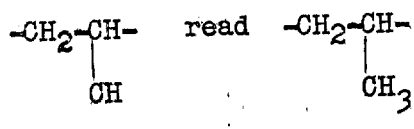

Signed and sealed this 10th day of May 1960.

(SEAL)
Attest:

KARL H. AXLINE
Attesting Officer

ROBERT C. WATSON
Commissioner of Patents